United States Patent Office 3,749,645
Patented July 31, 1973

3,749,645
FREE RADICAL ASSAY FOR REDOX ENZYMES
Richard K. Leute and Richard S. Schneider, Sunnyvale, Calif., assignors to Syva Corporation, Palo Alto, Calif.
No Drawing. Filed Mar. 3, 1971, Ser. No. 120,707
Int. Cl. G01n *31/14*
U.S. Cl. 195—103.5 R     9 Claims

ABSTRACT OF THE DISCLOSURE

Method of assaying for enzymes capable of catalyzing a reaction involving electron transport—reductions or oxidations—by introducing a stable organic radical or radical precursor compound into a medium suspected of containing such an enzyme and metering any change in the electron spin resonance (ESR) spectrum of the medium.

BACKGROUND OF THE INVENTION

Field of the invention

It is frequently desirable to be able to rapidly assay an unknown solution for its enzymatic activity. With those enzymes which undergo a reduction or oxidation reaction, the methods have generally employed optical spectroscopic techniques for detecting the conversion of the enzyme substrate to its product. See for example Velick, The Enzymes, vol. 7, editors P. D. Boyer, H. A. Lardy and K Myrback, Academic Press, New York, 1963, Chapter 12.

Obviously, spectrophotometric methods, depending on the transmission of light, have many shortcomings. The solution must be clear so as to transmit the light. In addition, other materials which may interfere with the absorption at the wave length being observed must be absent or compensated for. Further, it is difficult, if not impossible, to meter reactions in an intact or partially intact cell. Finally, one must deal with compositions which absorb light, either in the ultraviolet or the visible wave lengths.

DESCRIPTION OF THE PRIOR ART

Methods employed using spectrophotometric techniques are disclosed in The Enzymes, supra. Nitroxide radicals have been disclosed for a variety of purposes, particularly structure determination in U.S. Patents Nos. 3,453,288 and 3,489,522. See also Osiecki et al., J. Am. Chem. Soc. 90, 1078 (1968) and U.S. Pat. No. 3,197,508.

SUMMARY OF THE INVENTION

Free radicals or free radical precursors are introduced into a medium suspected of containing an enzyme capable of catalyzing a reaction involving electron transport—an oxidation or reduction reaction—and the change in the electron spin resonance spectrum metered. If a quantitative determination is desired, the rate of change of the spectrum can be monitored and by comparison with standards, the enzyme activity of the solution determined.

DETAILED DESCRIPTION

In accordance with this invention, a free radical compound or free radical precursor compound is introduced into a medium suspected of having an enzyme which is active in electron transport reactions. The medium employed in the testing has the enzyme substrate under conditions whereby the enzyme is active in carrying out the appropriate reaction. The product of this reaction, depending on its oxidation state, will then react, either directly or through an intermediate compound, with the free radical or free radical precursor to either destroy or produce a free radical. The electron spin resonance spectrum of the solution may be determined, and by the use of standards and by determination of the rate of change of the electron spin resonance spectrum, the enzymatic activity of the solution may be determined.

Extremely low concentrations of materials may be employed in view of the high sensitivity with which free radical compounds may be detected. In carrying out the assay, the various components are mixed together either directly in an ESR (electron spin resonance) sample holder or in a separate vessel and then transferred to the sample holder which is already installed in an ESR cavity or is introduced into an ESR cavity after filling. By controlling the temperature of the sample and by monitoring a particular portion of the ESR spectrum, the rate at which a radical is formed or destroyed can be readily determined.

Using enzyme active solutions of known activity, determined independently by other means, standards can be obtained, so that the rate of reaction in the unknown solution can be compared to the standards and the enzyme activity directly determined. Conveniently, the amount of reaction (change in spectrum) at a fixed time can be determined and this used for the determination of the enzyme activity, as being related to the rate of reaction. If an absolute value of the number of radicals introduced into the sample holder is known, the time for a fixed percent change may be used for the determination on the percent change to a fixed time.

Normally, the determination is made at moderate temperatures at which the enzyme is active, usually from about 10° to 40° C., more usually from about 25° to 38° C. The concentration of the free radical can be varied widely, normally being from about $10^{-2}$ M to about $10^{-8}$ M, preferably from about $10^{-3}$ M to $10^{-6}$ M. The amount of free radical compound employed will depend substantially on the signal intensity of the radical which is inversely related to the number and width of the lines, the solubility of the free radical in the medium, and the rate of the reaction between the free radical or free radical precursor and the oxidant or reductant. Since the choice of the remaining materials employed in the medium will for the most part be enzyme dependent, these will be discussed subsequently.

Free radical compounds

A wide variety of stable free radicals may be used, since each will provide an electron spin resonance spectrum which will diminish as the radical is reduced. For the various types of free radicals, see Forrester et al., Organic Chemistry of Stable Free Radicals, Academic Press, New York, 1968.

For the most part the stable free radicals will have the unpaired electron on oxygen or nitrogen, will usually have from 6 to 60 carbon atoms, more usually 6 to 30 carbon atoms, and from 2 to 16 heteroatoms, more usually from 2 to 12 heteroatoms, preferably nitrogen, oxygen, and sulfur, although from 0 to 3 halogens may be present in addition to the nitrogen and oxygen atoms.

A preferred group of compounds have the nitroxide functionality. The nitroxide free radicals employed in this invention have excellent thermal stability and from relatively good to excellent light stability. The salient factor of the nitroxide radical employed is that it is bonded to two carbon atoms which are bonded to other than hydrogen atoms, there being only few exceptions, where one of the carbon atoms bonded to the nitroxide is doubly bonded to another atom, e.g. nitrogen and carbon, or is a bridgehead atom.

The groups bonded to the nitroxide radical may be varied widely as to the number of atoms involved, variations in heteroatoms and functionalities, and may include aliphatic, alicyclic, aromatic, and heterocyclic groups which may or may not involve the nitroxide radical functionality in the ring. The nitroxide compound must be water soluble at least to the extent of $10^{-8}$ M or made so by the presence of auxiliary water miscible solvents, such as the oxygenated solvents of from 1 to 4 carbon atoms, including ketones, alcohols, esters, carboxylic acids, ethers, etc.

The nitroxide compounds employed in this invention will normally have at least 6 atoms other than hydrogen in addition to the nitroxide radical functionality, more usually at least 8 atoms other than hydrogen in addition to the nitroxide radical functionality and will generally have not more than about 60 atoms, more usually not more than about 30 atoms. In addition to the nitroxide heteroatoms, the molecule may have from 0 to 10 other heteroatoms. Furthermore, both mono- and poly- (usually di-) free radicals or mono- or poly- (usually di-) free radical precursors may be employed.

Those compounds which have the nitroxide free radical group or are a precursor to the nitroxide free radical will for the most part have the following formula:

wherein X is O· or OH, and A and B are bonded through carbon to the nitrogen and together may have up to 60 atoms other than hydrogen, more usually up to 30 atoms other than hydrogen, at least 6 atoms other than hydrogen and may have from 0 to 10 heteroatoms, normally oxygen, nitrogen, or sulfur, usually only oxygen and nitrogen. In some instances, where carboxylic acid functionalities are present, it may be convenient to have the carboxylic acid present as an alkali or alkaline earth metal salt. A and B may be monovalent groups bonded through carbon to the nitrogen or may be taken together to form a divalent group forming a heterocyclic ring with the nitrogen atom to which they are attached. Inclusive of the nitrogen, the ring may have a total of from 1 to 4 heteroannular members, more usually from 1 to 3 heteroannular members, normally oxygen, nitrogen and sulfur, most usually nitrogen.

The order of stability of the nitroxide will depend on whether the nitroxide is being reduced in the enzymatic reaction and therefore is used as the nitroxide radical or the nitroxide is being formed in the enzymatic reaction and is therefore being used in the form of the hydroxylamine or other precursor. In the former case, substantial stability is required so that the nitroxide may be stored and used as desired, retaining a substantial proportion of its activity for long periods of time. By contrast, if the nitroxide is being formed from the hydroxylamine or other precursor, then stability may be relatively short lived. First, the concentration at which the nitroxide is being formed is extremely low and therefore bimolecular reactions are extremely slow. Secondly, the time for the measurement should be relatively short and, therefore, half lives for the radical of 3 hours or longer will normally be sufficient. However, preferred precursor compounds are those which provide nitroxides having half lives of at least 12 hours and preferably of at least 24 hours under the conditions of the determination.

The nitroxide free radicals or their precursors may be divided into two groups of compounds: acyclic, which intends solely that the nitroxide nitrogen is not an annular member of a ring; and heterocyclic, which intends solely that the nitroxide nitrogen atom is a heteroannular member of a ring. The acyclic compounds will be considered first.

Because stability of the nitroxide radical varies, except for the simplest molecules, a general definition of the compounds which may find use is not available. However, some rules may be set forth and reasonable limitations put on the molecules which find use. Returning to a consideration of the formula previously indicated:

$X^1$ is the same as X and $A^1$ and $B^1$ may be the same or different. The molecule will usually have not more than about 60 atoms, usually not more than about 30 carbon atoms, from 2 to 10 heteroatoms, usually oxygen, nitrogen or sulfur, and at least 5 carbon atoms. $A^1$ and $B^1$ are bonded to the nitrogen atom through carbon atoms, wherein the carbon atom bonded to nitrogen is usually bonded to other than hydrogen, preferably carbon and nitrogen, either singly or doubly bonded. $A^1$ and $B^1$ may be aromatic, aliphatic, araliphatic, alaromatic (aliphatic hydrocarbon, substituted aromatic), alicyclic, heterocyclic, and heteroaliphatic (1 or more heteroatoms being intermediate the chain), as well as substituted analogs. In addition, $B^1$ may be a divalent group, wherein the second valence is bonded to

wherein the two $A^1$'s may be the same or different. When $A^1$ and $B^1$ are monovalent, they will normally have from 4 to 20 carbon atoms and from 0 to 4 heteroatoms, more usually from 0 to 2 heteroatoms. When the carbon atom to which the nitrogen atom is attached is aliphatic, $A^1$ and $B^1$ will usually have the following formula:

wherein $R^1$ and $R^2$ are lower alkyl (1 to 6 carbon atoms), usually lower alkyl of from 1 to 3 carbon atoms and preferably methyl, and Y is an organic radical, either substituted or unsubstituted, having 0 to 1 site of aliphatic unsaturation, which may be alkyl, alkenyl, alkinyl, cyano, alkoxycarbonyl, phenyl, substituted phenyl, etc. having from 0 to 2 heteroatoms and from 1 to 10, more usually from 1 to 8 carbon atoms, and bonded to the carbon atom through carbon.

$A^1$ and $B^1$ may be aryl hydrocarbon or substituted aryl (having only annular carbon atoms) wherein the ortho and para positions are free of substituents having a carbon bonded to hydrogen. Preferably, the para and/or ortho positions are substituted with tert.-alkyl, nitro, alkoxy, etc.

The nitrogen may be bonded to various heterocyclic rings, containing groups having from 3 to 9 carbon atoms and from 1 to 6 heteroatoms, such as barbituryl, pyrrolidine, α-pyridyldimethylmethyl, 4 - (N - methyl-4-methyl-piperidyl), 4-(4-methyltetrahydropyranyl), etc. As for hetero interrupted chains, the heteroaliphatic groups, the interruption heterofunctionalities can be nitrones, amines, ethers, etc., the heteroaliphatic group having from 4 to 18 carbon atoms and from 1 to 4 heteroatoms, more usually from 1 to 2 heteroatoms.

When B or $B^1$ is a divalent group, it will normally have from 6 to 20 carbon atoms, more usually from 6 to 12 carbon atoms, and from 0 to 4 heteroatms, wherein the carbon atoms attached to the nitrogen atoms of the nitroxide are attached to other than hydrogen, preferably to carbon, particularly preferred lower alkyl of from 1 to 3 carbon atoms, such as methyl.

The preferred compounds are those when A and B or $A^1$ and $B^1$ are taken together to form a ring with the nitrogen atom of the nitroxide functionality. The compounds employed may have from 1 to 2 of such rings.

The heterocyclic compounds will for the most part have the following formula:

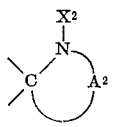

wherein $X^2$ is the same as X and $A^2$ is a divalent chain having from 2 to 5 annular members of which 0 to 3, usually 0 to 1, are heteroatoms, oxygen, nitrogen and sulfur. A² may be substituted or unsubstituted; there will usually be from 0 to 5 heteroatoms, normally nitrogen, oxygen, or sulfur, preferably nitrogen or oxygen. Two of these rings may be joined by a bond or chain of from 1 to 10 atoms, usually carbon, nitrogen and oxygen, or the ring may be bridged by or fused to such a chain. The molecule will normally be of from 5 to 30 carbon atoms with one nitroxide functionality or 10 to 60 carbon atoms with two nitroxide functionalities.

The free valences indicated at the alpha carbon atom are bonded to carbon atoms, except when the α-carbon is sp.² hybridized or is a bridgehead atom. With the sp.² hybridization or bridgeheads, the α-carbon may be bonded to hydrogen. With the imino or nitronyl nitroxides, the other α-carbon atom is bonded to a hydrogen atom or organic radical and doubly bonded to the annular nitrogen atom, while with porphyrexide the other α-carbon atom is bonded to an imino group.

A² may be saturated or aliphatically unsaturated, having one or two ethylenic groups, and may be substituted with a large variety of substituents. Illustrative substituents include imino, carboxy or nonoxocarbonyl (esters, acids, and amides) ethers, isocyanate, nitrile, amino, oxocarbonyl, nitro, etc.

One of the preferred subgenera of heterocyclic nitroxides are the five and six membered rings having the following formula:

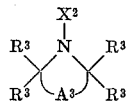

wherein X² is as defined previously and A³ is a divalent radical and is ethylene (—C—C—), ethynylene (—C=C—), propylene (—C—C—C—), propenylene (—C=C—C—) or the aza, thia or oxa analogs (by aza, thia and oxa it is intended that one of the carbon atoms is replaced with a nitrogen, sulfur or oxygen atom respectively. A³ may be substituted or unsubstituted. The various substituents have already been considered. The molecule will usually have from 7 to 30 carbon atoms, more usually 8 to 20 carbon atoms. A³ will normally be of from 2 to 8 carbon atoms having from 0 to 3 heteroatoms, usually oxygen and nitrogen. The R³'s may be the same or different and are usually hydrocarbon of from 1 to 12 carbon atoms, more usually alkyl of from 1 to 3 carbon atoms and preferably methyl. Two of the rings may be joined by a bond or chain having from 1 to 10 atoms other than hydrogen. The atoms will normally be carbon, nitrogen or chalcogen (oxygen or sulfur).

A second group of desirable heterocyclic compounds will have the following formula:

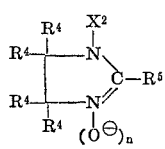

wherein R⁴'s are the same or different and are hydrocarbon of from 1 to 12 carbon atoms, usually alkyl of from 1 to 3 carbon atoms, and preferably methyl, X² is defined previously, n is 0 or 1, with the proviso that when n is 1, the nitrogen to which it is attached is positive, and R⁵ is hydrogen or an organic radical of from 1 to 12 carbon atoms and from 0 to 4 heteroatoms. The particular group R⁵ is not essential to the invention and may be any convenient group which provides the necessary solubility and provides a desirable spectral change.

A particularly preferred variant of the last structure has the following formula:

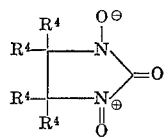

wherein the R⁴'s are as defined previously, and the remaining symbols have their normal meaning. This compound acts as a precursor to radical formation, undergoing reduction to form a radical.

The following compounds are illustrative of the wide variety of nitroxide compounds which may be employed in this invention or precursors to nitroxide compounds which either by oxidation or reduction form the nitroxide free radical.

1,3-dioxy-2-oxo-4,4,5,5-tetramethyl-2,3,4,5-tetrahydroimidazole,
1,3-dioxy-2-cyano-4,4,5,5-tetraethyl-4,5-dihydroimidazole,
1,3-dioxy-2-carbamoyl-4,5-dibenzyl-4,5-dimethyl-4,5-dihydroimidazole,
1,3-dioxy-4,4,5,5-p-tolylmethyl-4,5-dihydroimidazole,
1,3-dioxy-2-phenoxycarbonyl-4,4,5,5-tetramethyl-4,5-dihydroimidazole,
porphyrexide,
5,5-pentamethyleneporphyrexide,
di-tert.-butylnitroxide,
camphenyl-tert.-butylnitroxide,
diphenylhydroxylamine,
di-p-nitrophenylhydroxylamine,
di-(2,6-dimethoxyphenyl)nitroxide,
cumyl-tert.-butylnitroxide,
1-oxyl-2,2,6,6-tetramethylpiperidine,
1-oxyl-2,2,6,6-tetrapropylpiperidine,
1-oxyl-4-amino-2,2,6,6-tetraethylpiperidine,
1-oxyl-4-oxo-2,6-dibenzyl-2,6-dimethylpiperidine,
1-oxyl-2,2,5,5-tetraphenylpyrrolidine,
1-oxyl-2,5-di(p-tert.-butylphenyl)-2,5-dimethylpyrrolidine,
1-oxyl-3-oxo-2,2,5,5-tetramethylpyrrolidine,
1-oxyl-3-amino-2,2,5,5-tetramethylpyrrolidine,
1-oxyl-3-carboxy-2,2,5,5-tetramethyl-3-pyrroline,
1-oxyl-2,2,5,5-tetramethyl-3-pyrroline,
1-oxyl-3-tolyloxycarbonyl-2,2,5,5-tetramethyl-3-pyrroline,
1-oxyl-2,2,5,5-tetrabenzylpyrroline-3,
2,2,4,4-tetramethyl-oxazolidine-3-oxyl,
mesityltert.-butyl-nitroxide, and
8-azabicyclo[3.2.1]octan-3-ol-8-oxyl.

The compounds indicated above are known compounds or can be prepared according to known procedures. Those compounds which have hydroxyl, amino or carboxyl functionalities can be readily reacted according to known procedures with polyfunctional compounds to form the polynitroxides.

Illustrative linking groups are bromoacetic acid, oxalic acid, toluene diisocyanate, terephthalic acid, succinic acid, phosgene, p-xylylene dibromide, ethylene glycol, etc. The linking group will normally have from 1 to 12 carbon atoms and 0 to 6 heteroatoms, halogen (except fluorine), oxygen, nitrogen and sulfur.

As is evident from the wide variety of compounds which may be used either as the nitroxide radical or a precursor to the nitroxide radical, the salient factor is the presence of the nitroxide or nitroxide precursor functionality and not the wide variety of groups which may be bonded to the particular nitroxide or precursor nitroxide functionality. Therefore, in most cases the simplest compounds which provide the desired spectrum will be employed. These compounds as a class the tetramethyl substituted cyclic nitroxide which may or may not be monosubstituted with amino, hydroxy, oxo, carboxy (including carboxy derivatives such as esters, amides, and salts) halo, cyano, etc. These various functionalities may provide a particularly desirable feature for a particular system. The tetramethyl substituted ring compounds may have a nitrogen as an annular member and may have from 0 to 1 internal double bond. In addition, the nitrogen may be in its reduced or oxidized form.

A preferred aspect is partial or perdeuteration of the molecule, which results in improved resolution of the ESR spectrum.

A variety of other stable free radical compounds may also be used. The first class is the hydrazyls having the following formula:

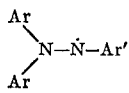

wherein the two Ar's may be the same or different and are aromatic, preferably carbocyclic of from 6 to 16 carbon atoms, more usually 6 to 12 carbon atoms and may have from 0 to 3 heterosubstituents, each Ar' has at least two heterosubstituents on the ortho and para positions, preferably three heterosubstituents, two of which are preferably nitro, and the remaining group may be chloro, hydrocarbyloxy, cyano, etc.

Illustrative compounds include diphenyl picryl hydrazyl, diphenyl 2,4-dinitro-6-(potassio sulfate) phenyl hydrazyl, and dinaphthyl picryl hydrazyl.

Another class of compounds related to the hydrazyls are the verdazyls. These compounds have the formula:

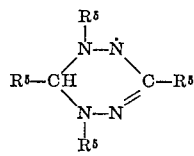

wherein the $R^5$'s may be the same or different and are conveniently hydrocarbon or substituted hydrocarbon, usually aromatic of from 6 to 12 carbon atoms. The substituents include halo, oxo and non-oxocarbonyl, nitro, etc. Usually, not more than one $R_5$ will be other than aromatic.

The total number of carbon atoms will usually be in the range of at least 20, preferably at least 26 and not more than 60, usually not more than 40 carbon atoms.

Another group of stable free radicals are the aroxyl radicals, which preferably have the following formula:

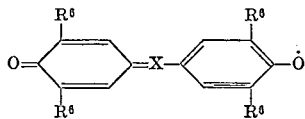

wherein X is CH or N, and $R^6$ is a tert.-alkyl group of from 4 to 8 carbon atoms, preferably 4 (tret.-butyl).

Finally, polyazoles (di- or tetra-) may be used, which for the most part have the following formula:

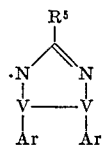

wherein $R^5$ and Ar have been defined previously and V—V may be N—N or C=C. The molecule will normally be of from 13 to 60 carbon atoms, more usually of from 19 to 30 carbon atoms.

The above list is not intended to be exhaustive, but merely illustrative of the different types of stable free radicals which may be used with advantage in the subject invention.

Enzymes

The enzymes which are assayed in the subject invention are the redox enzymes. That is, those enzymes which participate in electron transport, wherein the enzyme may undergo a reduction or oxidation and a substrate is oxidized or reduced respectively. This substrate will then react with the radical or radical precursor to form or destroy the radical, so that a change in the electron spin resonance spectrum of the medium is observed.

The various reductive and oxidative enzymes include iron enzymes, such as cytochrome and peroxidase; copper enzymes such as tyrosinase and ascorbic acid oxidase, enzymes which reduce cytochrome, such as succinic dehydrogenase; flavoproteins such as diaphorase, xanthine oxidase and cytochrome c reductase, and particularly those enzymes requiring coenzymes NAD and NADP such as alcohol dehydrogenase, lactic dehydrogenase, glucose dehydrogenase and glycerophosphate dehydrogenase.

Many of the enzymes which accept or donate electrons, transfer to or accept electrons from a cofactor. With those enzymes in carrying out the subject invention, the radical or radical precursor may react either with the substrate or the cofactor. That is, if the cofactor is oxidized, the cofactor may in turn oxidize the radical precursor to return the cofactor to its reduced state. Alternatively, if the cofactor is reduced, the radical may be reduced by the cofactor to return the cofactor to its oxidized state. Alternatively, the product of the reaction of the substrate and the enzyme may be such as to be able to react directly with the radical or radical precursor, so as to change its free radical nature.

Cofactors

A broad spectrum of enzymes have as a cofactor NAD or NADP. NAD is nicotinamide adenine dinucleotide, NADP is related to NAD by having an additional molecule of phosphoric acid esterified with the hydroxy group at position 2' of the ribose unit linked to adenine.

The significant portion of NAD and NADP, for the purpose of this invention, has the following structure:

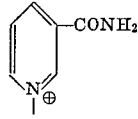

Upon reduction, the pyridinium ring becomes reduced to form a group having the following formula:

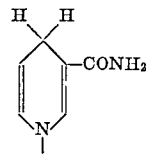

This dihydro coenzyme can transfer a hydrogen atom, either directly or through intermediate compounds, to a radical compound, so as to reduce the radical compound and destroy the free radical or, as a special situation, to an oxidized form of a nitroxide compound and reduce the compound to the nitroxide. For example, the dihydro coenzyme can reduce 1,3-dioxy-2-oxo-4,4,5,5-tetrahydrocarbylimidazolidine, so as to form a free radical. Therefore, in any reaction in which NAD is reduced to NADH, the enzymatic acivity of a solution may be assayed by following the formation of NADH by the formation or destruction of the nitroxide radical.

Another group of enzymes are the yellow oxidation enzymes, which have as a cofactor flavin mononucleotide (FMN) and flavin-adenine dinucleotide (FAD). The chemical functionality is the isoalloxazine ring, which in its reduced form can react directly or indirectly with the radical or the radical precursor to destroy or form a free radical. As with NAD and NADH, the enzymatic activity can be determined by metering the rate of formation of the reduced isoalloxazine.

A third class of enzymes are the oxidases or iron containing enzymes. Either hydrogen peroxide or oxygen can be used as the substrate to oxidize a radical precursor to the radical. Here, the substrate hydrogen peroxide or oxygen, provides "active oxygen" which, either directly or indirectly, reacts with a radical precursor, e.g. hydroxylamine, to form the radical. By following the rate of formation of the free radical, the enzymatic activity of the solution may be determined.

Thus, a wide variety of enzymes involved in oxidation or reduction may be assayed by having either free radical compounds or radical precursors react, directly or indirectly, with the enzyme so as to form or destroy the radical. Particularly, where cofactors are involved, such as NAD or FAD, the nitroxide radical can be formed by reducing an oxidized version of the nitroxide compound.

Medium

As is well known, enzymes require relatively specific acidities, salts, specific reactants, and occasionally intermediate compounds to act in the electron transport system. Quite obviously, the specificity of the enzymes will normally require specific substrates. To illustrate, peroxidase requires hydrogen peroxide, serum glutamate oxaloacetate transaminase requires the presence of glutamic acid and oxaloacetic acid or ketoglutaric acid and aspartic acid; and glutamate pyruvate transaminase requires the presence of glutamic acid or pyruvic acid or ketoglutaric acid and alanine.

To participate in the electron transport system, materials such as methylene blue, diaphorase, N-methylphenazinium sulfate, or other materials known to be active in the electron transport system may be employed.

Various buffers may be used which are well known in the art. In addition, as required, various metal salts, such as calcium, magnesium, sodium or zinc salts, may be introduced as necessary for the activity of the enzymes. The concentrations of these various additives have been well established and resort may be had to common biochemistry texts or the biochemical literature for such information.

EXAMPLES

Example 1—Assay of lactic acid dehydrogenase (NADH as electron transport with destruction of the nitroxide free radical)

Buffer reagent.—Into 50 ml. of water was dissolved 6.05 g. of tris(hydroxymethyl)ethylamine, the pH adjusted to 8.2 by the addition of 6.0 M hydrochloric acid and additional water added to provide a final volume of 100 ml.;

Substrate reagent.—Into 50 ml. of water was dissolved 2.5 ml. of L. (+) lactic acid, 40% solution (Mann Research Laboratories) 240 mg. of ethylene diamine tetraacetic acid, disodium dihydrate and the pH adjusted to 5.5 with 1 M sodium hydroxide. The solution was then diluted with water to a total volume of 120 ml.;

Oxidizing reagent.—Into 25 ml. of water was dissolved 12.5 mg. phenazine methosulfate, 125 mg. of nicotinamide adenine dinucleotide (NAD) and 4-hydroxy-2,2,6,6-teramethylpiperidino-1-oxyl (1.6 mg.) (The piperidino compound was prepared according to the method described in Rozantsev, Bull. Acad. Sci. USSR, 1964 2085 and Briere et al, Bull. Soc. Chim. France 1965 3273.)

A solution was prepared from 0.25 ml. of the substrate, 0.10 ml. of the buffer and 0.10 ml. of the oxidizing agent and allowed to stand at room temperature, protected from light for 5 minutes. At this time 0.050 ml. of serum was added and after mixing, the sample was transferred to an ESR capillary, inserted into the spectrometer and the peak intensity measured as a function of time for 30 minutes. The time measurement was commenced when the serum was added to the test solution. A plot of signal intensity versus time gave a linear curve with the slope directly proportional to the enzyme concentration.

A reagent blank (0.2 g. potassium oxalate and 0.2 g. ethylene diamine tetraacetic acid disodium dihydrate dissolved in 100 ml. water) was run in the same manner as described except that the control reagent was substituted for the substrate solution. The slope of the curve obtained for the reagent blank provides a zero point for the enzyme activity scale.

By carrying out a series of runs with varying concentrations of the lactic acid dehydrogenase, a concentration relationship can be determined, so as to determine the enzymatic activity of an unknown solution believed to contain lactic acid dehydrogenase. In accordance with the above method, the biradical of the formula:

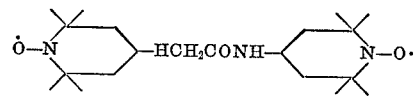

(the lines at the 2 and 6 position indicating methyl groups) is also used in the above assay.

Besides the lactic acid dehydrogenase, other dehydrogenases can be assayed in the same manner such as α-hydroxybutyric dehydrogenase; alcohol dehydrogenase; isocitric dehydrogenase; α - glycerophosphate dehydrogenase; and glyceraldehyde-3-phosphate dehydrogenase.

These various dehydrogenases are only illustrative and are not intended to be a complete listing of the dehydrogenases which may be used in accordance with the above method. Obviously, the substrate solution would have to be modified to fit the particular dehydrogenase and minor changes in the buffering or the addition of different additives might be required.

Example 2—Assay of lactic acid dehydrogenase (NADH as electron transport agent with formation of the nitroxide radical)

The following reagent solutions were prepared:

Buffer reagent.—Commercial phosphate buffer (0.2 M) was adjusted to pH 7.67;

Cofactor reagent.—Into 10 ml. of water was dissolved 33.3 mg. of nicotinamide adenine dinucleotide (NAD) which was diluted with a phosphate buffer to 25 ml. to provide a final concentration of NAD of $2 \times 10^{-4}$ M.;

Lactic acid reagent.—1 ml. of a 40 weight solution of L-lactic acid was diluted with a phosphate buffer to 50 ml. to provide a $9.5 \times 10^{-2}$ M solution;

Enzyme reagent.—60 μl of a lactic acid dehydrogenase suspension was diluted with phosphate buffer to 50 ml. to give a solution containing 400 milliunits/ml.;

Oxidizing reagent.—To 10 ml. of acetone was added 34.4 mg. of the radical precursor (the preparation will be described below). An aliquot of 2 ml. of this solution was diluted with phosphate buffer to 100 ml. to provide a $4 \times 10^{-4}$ M solution.

A mixture of 10 ml. of the lactic acid dehydrogenase reagent, 10 ml. of the NAD reagent and 10 ml. of the radical precursor reagent was equilibrated for 20 minutes at 30° C. To the mixture was then added 6 ml. of the lactic acid solution reagent, also at 30° C., and the appearance of the radical anion observed by ESR. There was a linear relationship between the increasing ESR signal intensity and time. The method was made quantitative as in the preceeding method by determination of the rate of reaction of solution containing no enzyme to provide a zero point for the enzyme activity scale.

The radical precursor employed above may be prepared as described below (see also co-pending application Ser. No. 724,591, filed Apr. 26, 1968, now abandoned).

N,N-dihydroxy - 2,3 - diamino - 2,3 - dimethylbutane (250 mg.) suspended in benzene (50 ml.) was added to an excess of ethyl chloroformate and the solution heated to boiling for 5 minutes. The solution was then extracted with aqueous sodium bicarbonate (50 ml.). This solution was treated dropwise with bromine until the solution turned bright yellow and then extracted with chloroform (50 ml.) and the extract washed with water and dried over sodium sulfate. Filtration and evaporation left an orange residue which was chromatographed on silica gel using ether as eluent. The yellow band was collected and evaporated giving 1,3-dioxy-2-oxo-4,4,5,5-tetramethyltetrahydroimidazole.

The ease with which the enzyme assay can be carried out is evident from the above examples. Enzymes can be assayed at extremely low concentrations with a high degree of accuracy. In addition, a variety of compounds may be used, depending on particular situations, which either form a radical, e.g. nitroxide, or in which a radical is destroyed. Furthermore, the radical or radical precursor, having the appropriate functionalities, can be introduced into biologically intact systems and the rate of change of the ESR spectrum determined.

Since the method of this invention employs compounds which can be stored for long periods of time and shipped, reagents can be provided which may be used readily by those having little or no technical skill and the results easily and rapidly determined by providing a simple mechanical correlation to known standard scales.

What is claimed is:

1. A method for determining the enzymatic activity of a solution suspected of containing an enzyme which catalyzes a reaction involving electron transport which comprises:
   introducing into said solution under conditions for said enzyme catalyzing said reaction an organic compound of the formula:

wherein:
   $X^1$ is O· or OH, when $X^1$ is O·, said organic compound is a nitroxide stable free radical and when $X^1$ is OH, said organic compound is a precursor to a nitroxide stable free radical, $A^1$ and $B^1$ are the same or different, and are bonded to the nitrogen atom through a carbon atom, wherein the carbon atom bonded to the nitrogen atom is bonded to other than hydrogen, and can be taken together to form a heterocyclic ring with the nitrogen atom to which they are attached; and
   detecting the change in the electron spin resonance spectrum of said organic compound as a result of said enzyme catalyzed electron transport reaction; and determining the activity of said enzyme from said change.

2. A method according to claim 1, wherein $A^1$ and $B^1$ are taken together to form a ring having the following formula:

wherein $X^2$ is —O· or —OH and $A^2$ is a divalent chain having from 2 to 5 annular members of which 0 to 3 are the heteroatoms, oxygen, nitrogen or sulfur, the compound having a total of from 5 to 30 carbon atoms and from 0 to 5 heteroatoms.

3. A method according to claim 1, wherein $A^1$ and $B^1$ are taken together to form a ring having the formula:

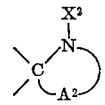

wherein $X^2$ is —O· or —OH and $A^2$ is a divalent chain having from 2 to 5 annular members of which 0 to 3 are the heteroatoms, oxygen, nitrogen or sulfur, and wherein two such rings are bonded together by a bond or a chain of from 1 to 6 atoms to form a compound having from 10 to 60 carbon atoms.

4. A method for determining the enzymatic activity of a solution suspected of containing an enzyme which catalyzes a reaction which produces the reduced form of nicotinamide adenine dinucleotide, which comprises:
   combining with said solution under conditions under which said enzyme is capable of reducing a member of the group consisting of nicotinamide adenine dinucleotide and nicotinamide adenine dinucleotide phosphate a compound of the formula:

wherein:
   $A^1$ and $B^1$ are the same or different, and are bonded to the nitrogen atom through a carbon atom, wherein the carbon atom bonded to the nitrogen atom is bonded to other than hydrogen, and can be taken together to form a heterocyclic ring with the nitrogen atom to which they are attached; and
   detecting the change in the electron spin resonance spectrum of said compound; and determining the activity of said enzyme from said change.

5. A method according to claim 4, wherein said nitroxide free radical compound is of the formula:

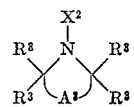

wherein $X^2$ is O·, the $R^3$'s are the same or different and are hydrocarbon of from 1 to 12 carbon atoms $A^3$ is ethylene, ethenylene, propenylene, heteroethylene, heteroethenylene, heteropropylene, or heteropropenylene, wherein hetero is oxygen, nitrogen or sulfur.

6. A method according to claim 4, wherein $A^1$ and $B^1$ are taken together to form a heterocyclic ring and wherein two of said rings are joined by a bond or chain having from 1 to 10 atoms other than hydrogen which are carbon, oxygen, nitrogen or sulfur.

7. A method according to claim 5, wherein $R^4$ is methyl.

8. A method according to claim 4, wherein said nitroxide free radical compound is 4-hydroxy-2,2,6,6-tetramethylpiperidinyl-1-oxyl.

9. A method for determining the enzymatic activity of a solution suspected of containing an enzyme which catalyzes a reaction which produces the reduced form of nicotinamide adenine dinucleotide, which comprises:
   combining with said solution under conditions under which said enzyme reduces a member of the group consisting of nicotinamide adenine dinucleotide, and nicotinamide adenine dinucleotide phosphate, a compound of the formula:

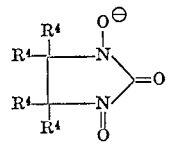

wherein:
   the $R^4$'s are the same or different, and are hydrocarbon of from 1 to 12 carbon atoms; and
   detecting the change in the electron spin resonance spectrum of said compound; and determining the activity of said enzyme from said change.

References Cited

Piette et al.: "Biochim. Biophys. Acta" 88, 120–129 (1964).

Veda: "Anal. Chem." 35 (13), 2213–2214 (1963).

ALVIN E. TANENHOLTZ, Primary Examiner

M. D. HENSLEY, Assistant Examiner

U.S. Cl. X.R.

195—99